(12) United States Patent
Miyagawa et al.

(10) Patent No.: US 11,884,254 B2
(45) Date of Patent: Jan. 30, 2024

(54) VEHICLE BRAKE SYSTEM AND METHOD FOR INCREASING BRAKE PRESSURE IN A FIRST WHEEL BRAKE CYLINDER AND LIMITING BRAKE PRESSURE IN A SECOND WHEEL BRAKE CYLINDER OF A VEHICLE BRAKE SYSTEM

(71) Applicant: Robert Bosch GmbH, Stuttgart (DE)

(72) Inventors: Shuichi Miyagawa, Stuttgart (DE);
Jochen Bodmann, Oberstenfeld (DE);
Yasutaka Nagakura, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 17/047,809

(22) PCT Filed: Apr. 11, 2019

(86) PCT No.: PCT/EP2019/059189
§ 371 (c)(1),
(2) Date: Oct. 15, 2020

(87) PCT Pub. No.: WO2019/206647
PCT Pub. Date: Oct. 31, 2019

(65) Prior Publication Data
US 2021/0162968 A1 Jun. 3, 2021

(30) Foreign Application Priority Data
Apr. 27, 2018 (DE) .......................... 102018206566.7

(51) Int. Cl.
*B60T 8/40* (2006.01)
*B60T 8/44* (2006.01)
*B60T 8/48* (2006.01)

(52) U.S. Cl.
CPC ............ *B60T 8/4072* (2013.01); *B60T 8/442* (2013.01); *B60T 8/4872* (2013.01); *B60T 2220/04* (2013.01); *B60T 2270/604* (2013.01)

(58) Field of Classification Search
CPC ........... B60T 2220/04; B60T 2270/604; B60T 8/4072; B60T 8/442; B60T 8/4872
See application file for complete search history.

(56) References Cited

U.S. PATENT DOCUMENTS

| 10,773,595 | B2 * | 9/2020 | Drotleff | ................. | B60T 13/686 |
| 2013/0292999 | A1 * | 11/2013 | Strengert | ................ | B60T 8/268 |
| | | | | | 303/10 |

(Continued)

FOREIGN PATENT DOCUMENTS

| CN | 101024396 A | 8/2007 |
| CN | 104379418 A | 2/2015 |

(Continued)

OTHER PUBLICATIONS

International Search Report for PCT/EP2019/059189, dated Jul. 18, 2019.

*Primary Examiner* — Peter D Nolan
*Assistant Examiner* — Wae L Louie
(74) *Attorney, Agent, or Firm* — Norton Rose Fulbright US LLP; Gerard A. Messina (57) ABSTRACT

A vehicle brake system and method for increasing the brake pressure in a first wheel brake cylinder and for limiting the brake pressure in a second wheel brake cylinder of a vehicle brake system. The method includes increasing a first brake pressure in the first wheel brake cylinder by controlling/holding a wheel inlet valve in its open state and controlling/holding a first wheel outlet valve in its closed state, and limiting an increase of a second brake pressure in the second wheel brake cylinder during the transfer of brake fluid into the first wheel brake cylinder by controlling/holding a (Continued)

second wheel inlet valve in its closed state and controlling a second wheel outlet valve into its open state. The second wheel outlet valve is controlled with a pulse width-modulated signal so that during the transfer of brake fluid, the second wheel outlet valve is permanently in its open state.

10 Claims, 7 Drawing Sheets

(56) References Cited

U.S. PATENT DOCUMENTS

| | | | |
|---|---|---|---|
| 2014/0244127 A1* | 8/2014 | Strengert | B60T 7/042 |
| | | | 701/70 |
| 2015/0232076 A1* | 8/2015 | Oosawa | B60T 1/10 |
| | | | 303/10 |
| 2017/0096132 A1* | 4/2017 | Druckenmueller | B60T 8/3655 |
| 2019/0256069 A1* | 8/2019 | Beauvais | B60T 8/72 |
| 2019/0270385 A1* | 9/2019 | Drotleff | B60T 8/4872 |
| 2019/0375391 A1* | 12/2019 | Ernst | B60T 7/042 |
| 2021/0162968 A1* | 6/2021 | Miyagawa | B60T 8/36 |
| 2022/0379859 A1* | 12/2022 | Ieluzzi | B60T 8/368 |

FOREIGN PATENT DOCUMENTS

| | | |
|---|---|---|
| CN | 107428317 A | 12/2017 |
| DE | 102012222974 A1 | 6/2014 |
| EP | 0075657 A2 | 4/1983 |
| JP | 2001260840 A | 9/2001 |
| JP | 2003271463 A | 9/2003 |
| JP | 2008273338 A | 11/2008 |
| JP | 5233950 B2 | 7/2013 |
| WO | 9410016 A1 | 5/1994 |
| WO | 2013017314 A2 | 2/2013 |
| WO | 2013092169 A1 | 6/2013 |

* cited by examiner

Fig. 1a
( Existing Art )

Fig. 1b
( Existing Art )

Fig. 1c
( Existing Art )

VEHICLE BRAKE SYSTEM AND METHOD FOR INCREASING BRAKE PRESSURE IN A FIRST WHEEL BRAKE CYLINDER AND LIMITING BRAKE PRESSURE IN A SECOND WHEEL BRAKE CYLINDER OF A VEHICLE BRAKE SYSTEM

FIELD

The present invention relates to a vehicle brake system. The present invention also relates to a method for increasing brake pressure in a first wheel brake cylinder and for limiting brake pressure in a second wheel brake cylinder of a vehicle brake system.

BACKGROUND INFORMATION

Figure 1A:
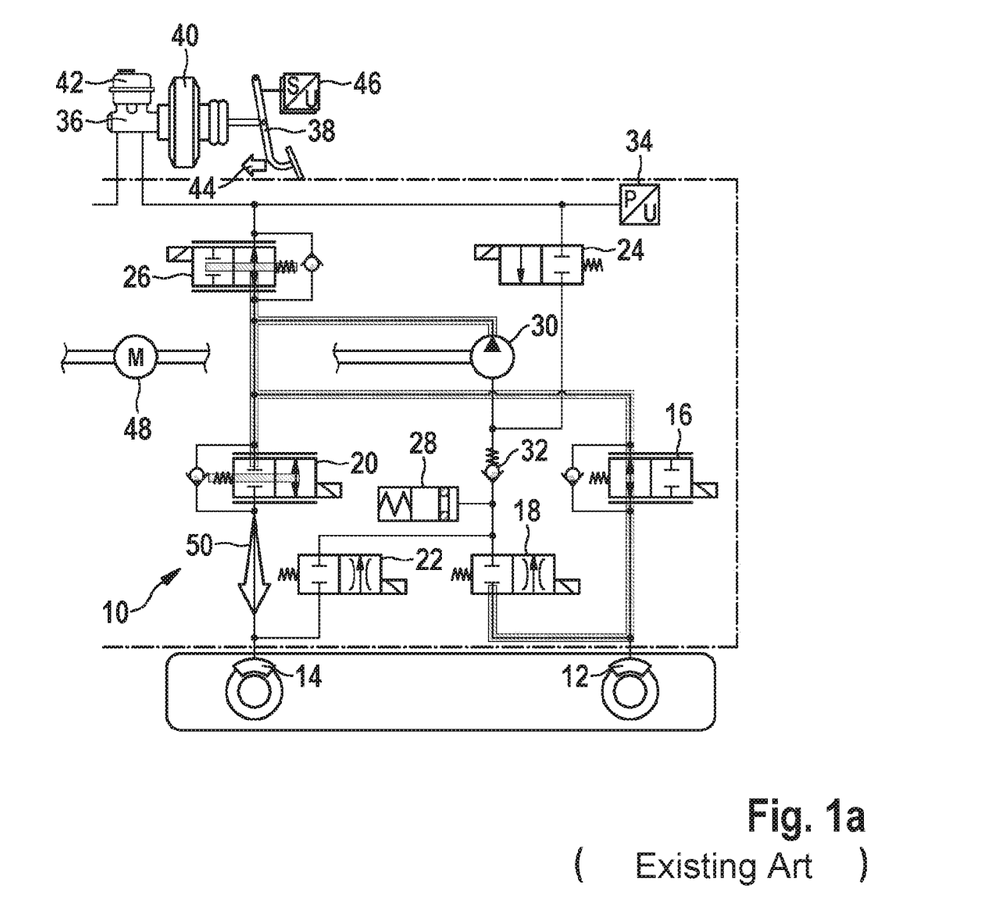
FIGS. 1a through 1c show a schematic partial representation of a vehicle brake system and coordinate systems for the explanation of a conventional procedure for increasing brake pressure with simultaneous brake pressure limiting.
Figure 1B:
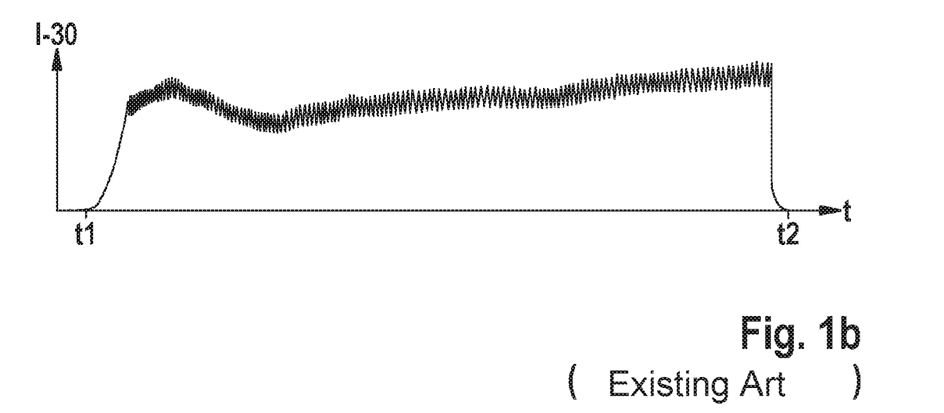
Figure 1C:
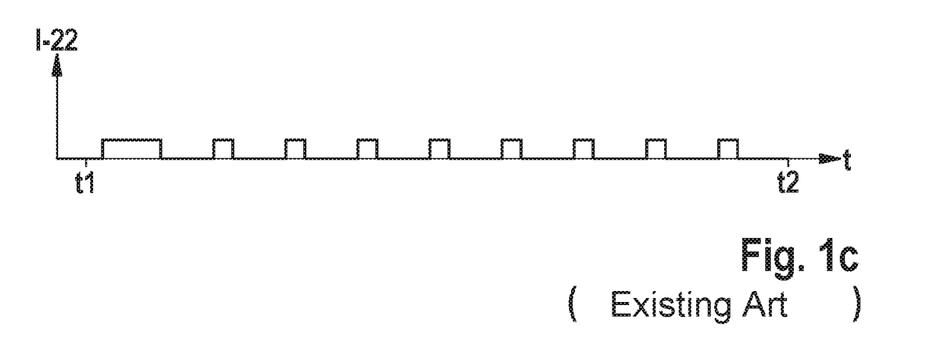

FIGS. 1a through 1c show a schematic partial representation of a vehicle brake system and coordinate systems for the explanation of a conventional procedure for increasing brake pressure with simultaneous brake pressure limiting.

FIG. 1a shows a schematic partial representation of a conventional brake system as described, for example, in German Patent Application No. DE 10 2012 222 974 A1. The conventional brake system has at least one brake circuit 10 having a first wheel brake cylinder 12, a second wheel brake cylinder 14, a first wheel inlet valve 16 assigned to first wheel brake cylinder 12, a first wheel outlet valve 18 assigned to first wheel brake cylinder 12, a second wheel inlet valve 20 assigned to second wheel brake cylinder 14, and a second wheel outlet valve 22 assigned to second wheel brake cylinder 14. Moreover, brake circuit 10 is realized having a high-pressure switching valve 24, a changeover valve 26, a storage chamber situated after wheel outlet valves 18 and 22, a return pump 30, a check valve 32 situated between storage chamber 28 and return pump 30, and a pressure sensor/pre-pressure sensor 34. Brake circuit 10 is connected (together with a further brake circuit (not shown)) to a master brake cylinder 36. In addition, another brake actuating element/brake pedal 38, a brake booster 40, and a brake fluid reservoir 42 are connected to master brake cylinder 36. An actuation of brake actuating element/brake pedal 38 by a driver with a schematically shown driver's braking force 44 is detectable by at least one brake actuating element sensor 46. FIG. 1a also shows a pump motor 48 on whose shaft the return pump 30 is situated (together with a further return pump of the further brake circuit (not shown)).

Using the coordinate systems of FIGS. 1b and 1c, a conventional procedure for increasing brake pressure with simultaneous brake pressure limiting is shown that is internal existing art. Each of the abscissas of the coordinate systems of FIGS. 1b and 1c is a time axis t. Using the ordinate of the coordinate system of FIG. 1b, a current strength I-30 of an operating current is shown that, for the operation of return pump 30, is supplied to its pump motor 48. The ordinate of the coordinate system of FIG. 1c shows a current strength I-22 of a control signal for controlling/switching second wheel outlet valve 22.

Using the conventional procedure described below for increasing brake pressure with simultaneous brake pressure limiting, a first brake pressure in first wheel brake cylinder 12 (during an actuation of brake actuating element/brake pedal 38) is to be rapidly increased by, from a time t1 until a time t2, transferring brake fluid into first wheel brake cylinder 12 by an operation of return pump 30. During the transferring of brake fluid into first wheel brake cylinder 12, first wheel inlet valve 16 is controlled into its open state, and first wheel outlet valve 18 is controlled into its closed state.

In order at the same time to counteract an undesired increase of a second brake pressure in second wheel brake cylinder 14, second wheel inlet valve 20 is controlled into its closed state during the transfer of brake fluid into first wheel brake cylinder 12. However, an undesired flow 50 of brake fluid into second wheel brake cylinder 14 often cannot be completely suppressed/prevented by closed second wheel inlet valve 20. Therefore, during the transfer of brake fluid into first wheel brake cylinder 12, second wheel outlet valve 22 is repeatedly (for example, every 0.8 seconds) briefly controlled, with a load of 100%, from its closed state into its open state in order to conduct brake fluid out of second wheel brake cylinder 14 into storage chamber 28 via the briefly (e.g., for approximately 0.2 seconds) opened second wheel outlet valve 22. Thus, second wheel outlet valve 22 is periodically opened and closed. In order to switch the second wheel outlet valve into its open state with a load of 100%, as a rule a signal having a current strength value, constant over time, of 2 A (amperes) is required.

SUMMARY

The present invention provides a vehicle brake system and a method for increasing brake pressure in a first wheel brake cylinder and for limiting brake pressure in a second wheel brake cylinder of a vehicle brake system.

The present invention provides possibilities for bringing about a brake pressure increase in a first wheel brake cylinder of a vehicle brake system, in which a first brake pressure in the first wheel brake cylinder can be increased relatively quickly using at least one brake pressure buildup device, while at the same time an undesired increase is reliably prevented of a second brake pressure in a second wheel brake cylinder of the vehicle brake system, which can likewise be filled by the at least one brake pressure buildup device. In addition, when the present invention is used it is ensured that the undesired increase of the second brake pressure in the respective second wheel brake cylinder is prevented in (substantially) noiseless fashion. This is a significant advantage compared to the existing art described above, in which the (periodic/cyclical) opening and closing of the second wheel outlet valve causes comparatively loud noise. A further advantage of the present invention is that during its use the undesired increase of the second brake pressure is not only limitable, but is constantly preventable. As is explained more precisely in the following, overheating of the second wheel outlet valve also need not be feared during use of the present invention.

The present invention can be used to increase a first brake pressure in a first wheel brake cylinder of a brake circuit of a vehicle brake system, and at the same time to prevent an undesired increase of a second brake pressure in a second wheel brake cylinder of the same brake circuit (realized having the respective first wheel brake cylinder). Thus, the present invention provides possibilities for bringing about a brake pressure increase in at most one (first) wheel brake cylinder per brake circuit of a vehicle brake system, with simultaneous prevention of a brake pressure increase in at least one further (second) wheel brake cylinder of the vehicle brake system. Likewise, the present invention can be used to increase a first brake pressure in at least one first wheel brake cylinder of a first brake circuit of a vehicle brake system, and at the same time to prevent an undesired increase of a second brake pressure in at least one second wheel brake cylinder of a second brake circuit of the vehicle brake system. The present invention is thus versatile in its possible uses.

In an advantageous specific embodiment of the vehicle brake system in accordance with the present invention, the control device is designed to hold, during operation of the at least one brake pressure buildup device, a current strength maximum and a duty cycle of the pulse width-modulated signal low enough that the current strength maximum and the duty cycle are just sufficient for the second wheel outlet valve, controlled by the pulse width-modulated signal, to be permanently in its open state. A current strength, averaged over time, of the pulse width-modulated signal outputted to the second wheel outlet valve during the transferring of brake fluid into the first wheel brake cylinder is thus comparatively low, so that no overheating of the second wheel outlet valve (or of its electronics) need be feared.

For example, the control device can be designed to hold, during the operation of the at least one brake pressure buildup device, the current strength maximum and the duty cycle of the pulse width-modulated signal low enough that the pulse width-modulated signal has a current strength, averaged over time, of less than 0.5 A. Using the example procedure according to the present invention described here, a thermal load of the second wheel outlet valve (or its electronics) can thus reliably be minimized. Moreover, current consumption can be reduced using the procedure described here.

Preferably, the control device includes at least one flyback diode and is designed to output the pulse width-modulated signal to the second wheel outlet valve using the flyback diode. Thus, the flyback diode, frequently already in use, can also be used for the realization of the present invention. The present invention thus also contributes to increasing the multifunctionality of the flyback diode additionally used in this way.

For example, the vehicle brake system can include a master brake cylinder to which a brake actuating element is connectable or is connected and/or before which there is connected a brake booster, at least one pump, and/or at least one motorized plunger device as the at least one brake pressure buildup device. Thus, brake pressure buildup devices that are frequently already present in a vehicle brake system can additionally be used for the present invention. However, it is to be noted that the practicability of the present invention is not limited to the use of the examples listed here of the at least one brake pressure buildup device.

As mentioned above, the first wheel brake cylinder with its first wheel inlet valve and its first wheel outlet valve, and the second wheel brake cylinder with its second wheel inlet valve and its second wheel outlet valve, can be situated in a common brake circuit of the vehicle brake system. The present invention can thus be used to trigger different braking actions of two wheel brake cylinders of the same brake circuit.

The advantages described above are also brought about by a realization of a corresponding method for increasing brake pressure in a first wheel brake cylinder and for limiting brake pressure in a second wheel brake cylinder of a vehicle brake system. Here it is expressly noted that the method is capable of being further developed according to the above-explained specific embodiments of the vehicle brake system.

BRIEF DESCRIPTION OF THE DRAWINGS

Further features and advantages of the present invention are explained below on the basis of the Figures.

DETAILED DESCRIPTION OF EXAMPLE EMBODIMENTS

FIGS. 2a through 2d show a schematic partial representation of a vehicle brake system and coordinate systems for the explanation of a first specific embodiment of the method for increasing brake pressure in a first wheel brake cylinder and for limiting brake pressure in a second wheel brake cylinder of the vehicle brake system.

Figure 2A:
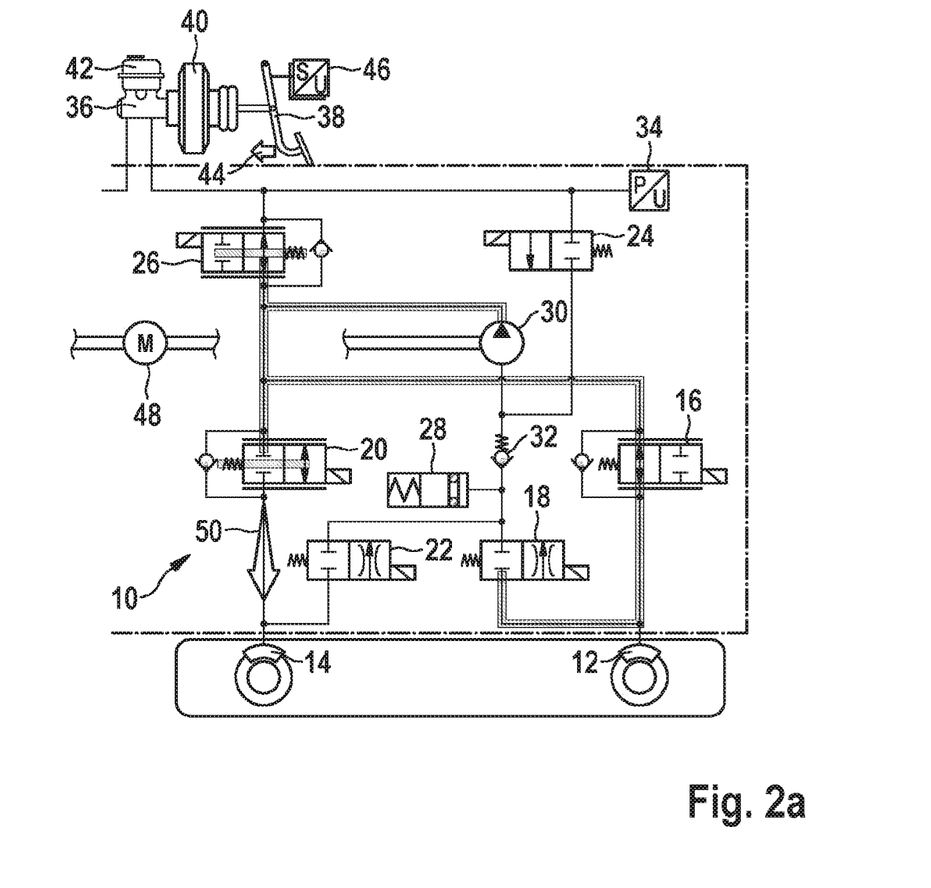
FIGS. 2a through 2d show a schematic partial representation of a vehicle brake system and coordinate systems for the explanation of a first specific embodiment of a method in accordance with the present invention for increasing brake pressure in a first wheel brake cylinder and for limiting brake pressure in a second wheel brake cylinder of the vehicle brake system.
Figure 2B:
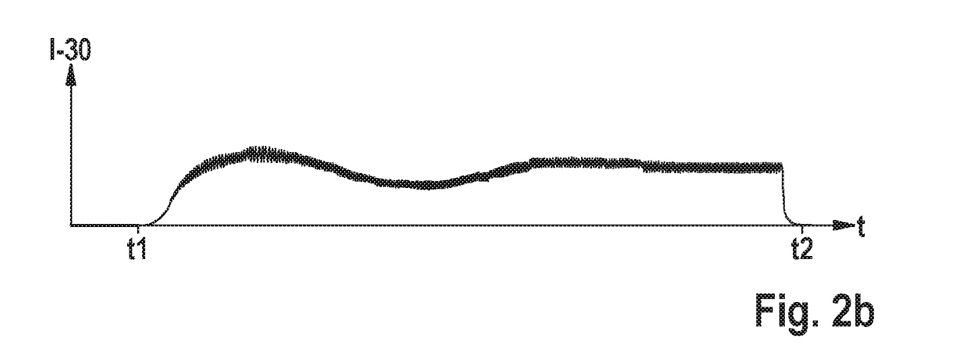

The vehicle brake system partly shown schematically in FIG. 2a has at least one brake circuit 10 having a first wheel brake cylinder 12, a second wheel brake cylinder 14, a first wheel inlet valve 16 assigned to first wheel brake cylinder 12, a first wheel outlet valve 18 assigned to first wheel brake cylinder 12, a second wheel inlet valve 20 assigned to second wheel brake cylinder 14, and a second wheel outlet valve 22 assigned to second wheel brake cylinder 14. Merely as an optional development, brake circuit 10 additionally includes a high-pressure switching valve 14, a changeover valve 26, a storage chamber 28 (such as a low-pressure storage chamber) connected after wheel outlet valves 18 and 22, at least one pump/return pump 30, a check valve 32 situated between storage chamber 28 and return pump 30, and at least one pressure sensor and/or pre-pressure sensor 34. However, the realization shown in FIG. 2a of brake circuit 10, having components 24 to 34, is to be interpreted only as an example.

The vehicle brake system also has at least one brake pressure buildup device 30 and 36 connected both to first wheel brake cylinder 12 and to second wheel brake cylinder 14. For example, in the specific embodiment of FIG. 2a, brake pressure buildup device 36 includes the at least one pump 30 (having a pump motor 48) and/or a master brake cylinder 36 having a pre-positioned brake actuating element 38 (such as a brake pedal 38) for actuation by a driver with a schematically shown (and possibly detected by a brake actuation element sensor 46) driver's braking force 44, and/or a pre-positioned brake booster 40, at least brake circuit 10 and a brake fluid reservoir 42 being connected to master brake cylinder 36. (Brake booster 40 can also be interpreted as at least part of the at least one brake pressure buildup device 30 and 36.) However, as an alternative to the at least one pump 30 and/or master brake cylinder 36, at least one motorized plunger device can also be used as (part of) brake pressure buildup device 30 and 36.

In addition to brake circuit 10 connected to master brake cylinder 36, the vehicle brake system can also have at least one further brake circuit (not shown). The at least one further brake circuit can be realized identically to depicted brake circuit 10. Alternatively, the at least one further brake circuit may also differ from brake circuit 10. For example, the at least one further brake circuit may be decoupled from master brake cylinder 10, or may be capable of being decoupled from master brake cylinder 10.

It is expressly to be noted that the practicability of the method described below is limited neither to a particular brake system type of the vehicle brake system nor to a specific vehicle type/motor vehicle type of the vehicle/motor vehicle equipped with the vehicle brake system.

Using the method described below, an increase in brake pressure is to be brought about in first wheel brake cylinder 12 of brake circuit 10, while at the same time a brake pressure increase in second wheel brake cylinder 14 of the same brake circuit 10 is prevented. The method can also be realized, in a vehicle brake system having at least two brake circuits 10 each having two wheel brake cylinders 12 and 14, in such a way that an increase in brake pressure in a (first) wheel brake cylinder 12 of the respective brake circuit 10 is brought about in all brake circuits 10 of the vehicle brake system, and at the same time is prevented in a (second) wheel brake cylinder 14 of the same brake circuit 10, so that a number of (first) wheel brake cylinders 12 in which an increase in brake pressure is brought about is equal to a number of brake circuits 10 of the vehicle brake system, and each brake circuit 10 has the respective (first) wheel brake cylinder 12 in which an increase in brake pressure is brought about and has the respective (second) wheel brake cylinder 14 in which the increase in brake pressure is prevented. The respective increase in brake pressure can be used for example for a TCS function (drive slippage regulation, or Traction Control System), a VDC function (electronic stability program, or Vehicle Dynamics Control), a VAF function (autonomous driving function), or for a masking of a generator braking torque. However, the examples listed here of the use of the respective increase in brake pressure are not to be interpreted as exhaustive.

When the example method described herein is carried out, brake fluid is transferred into first wheel brake cylinder 12 at least of brake circuit 10, in order to bring about a (preferably rapid and/or significant) increase of a first brake pressure in first wheel brake cylinder 12. The transfer of brake fluid into first wheel brake cylinder 12 is carried out for example using the at least one pump 30, as is shown in the coordinate system of FIG. 2b. In the coordinate system of FIG. 2b, the abscissa is a time axis t, while the ordinate of FIG. 1b is used to show a current strength I-30 of an operating current that, for the operation of the at least one pump 30, is supplied to its pump motor 48. From a time t1 to a time t2, brake fluid is pumped in the direction towards first wheel brake cylinder 12 by operation of the at least one pump 30. As an alternative or in addition to the operation of the at least one pump 30, however, the transfer of brake fluid into the first wheel brake cylinder can also/additionally be brought about by a driver's braking force 44 exerted on brake actuating element/brake pedal 38, and/or by an operation of brake booster 40 (or by an operation of the at least one motorized plunger device).

During the transfer of brake fluid into first wheel brake cylinder 12, first wheel outlet valve 16 assigned to first wheel brake cylinder 12 is controlled and/or held in its open state. At the same time, first wheel outlet valve 18 assigned to first wheel brake cylinder 12 is controlled and/or held in its closed state. Because first wheel outlet valve 16 is in its open state and first wheel outlet valve 18 is in its closed state, during the transfer of brake fluid into first wheel brake cylinder 12 (by the operation of the at least one pump 30) it is ensured that the first brake pressure in first wheel brake cylinder 12 is increased, preferably rapidly and/or significantly.

In order to at least limit an (undesired) increase of the second brake pressure in second wheel brake cylinder 14 of (the same) brake circuit 10 during the transfer of brake fluid into first wheel brake cylinder 12, second wheel outlet valve 20 assigned to second wheel brake cylinder 14 is controlled and/or held in its closed state. However, an undesired flow 50 of brake fluid into second wheel brake cylinder 14 often cannot be completely suppressed/prevented by the closed second wheel inlet valve 20. Therefore, it is desirable for second wheel outlet valve 22 assigned to second wheel brake cylinder 14 to be controlled into its open state at least at times.

In the method described herein, this is brought about by controlling second wheel outlet valve 22, during the transfer of brake fluid into first wheel brake cylinder 12, with a pulse width-modulated signal in such a way that the pulse width-modulated signal (during the transfer of brake fluid into first wheel brake cylinder 12) brings it about that second wheel outlet valve 22 is permanently in its open state. This is shown graphically in the coordinate systems of FIGS. 2c and 2d.

Figure 2C:
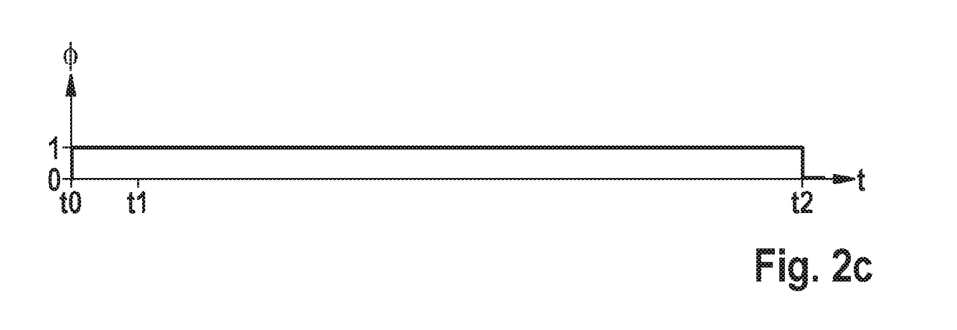
Figure 2D:
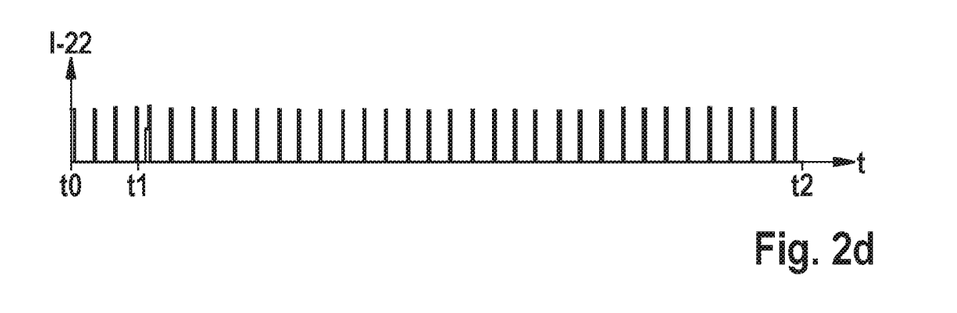

The abscissas of the coordinate systems of FIGS. 2c and 2d are each a time axis t. Using the ordinate of the coordinate system of FIG. 2c, a current switching state $\phi$ of second wheel outlet valve 22 is shown that can alternate between "0=zero," i.e., second wheel outlet valve 22 is closed, and "1=one," i.e., second wheel outlet valve 22 is open. The ordinate of the coordinate system of FIG. 2d indicates a current strength I-22 of a control signal for controlling/switching second wheel outlet valve 22.

Between a time t0 (before or almost equal to time t1) and time t2, the pulse width-modulated signal is outputted as control signal for controlling/switching second wheel outlet valve 22. As can be seen in the coordinate system of FIG. 2c, for this reason second wheel outlet valve 22 is permanently in its open state during the entire operation of the at least one pump 30 between times t1 and t2. The example method described herein therefore not only brings about a limitation of the (undesired) increase of the second brake pressure, but also brings about a reliable prevention of an increase of the second brake pressure in second wheel brake cylinder 14 (past a reaction pressure of storage chamber 28).

The example method described here brings about a "permanent holding open" of second wheel outlet valve 22 during the transfer of brake fluid into first wheel outlet valve 12 (instead of the periodic opening and closing of second wheel outlet valve 22 according to the conventional procedure described above). Because, using the example method described here, second wheel outlet valve 22 is permanently (i.e., temporally constantly) held in its open state between times t0 and t2, no valve switching noise is produced by the opening and closing of second wheel outlet valve 22. The driver is thus not irritated or burdened by valve switching noises. The method described here is therefore significantly more driver-friendly than the conventional procedure described above, which frequently causes valve switching noises that are perceptible by the driver.

Preferably, during the transfer of brake fluid into first wheel brake cylinder 12, a current strength maximum and a duty cycle of the pulse width-modulated signal are kept low enough that the current strength maximum and the duty cycle are just sufficient to bring it about that second wheel outlet valve 22 is permanently in its open state during the transfer of brake fluid into first wheel brake cylinder 12. For example, during the transfer of brake fluid into first wheel brake cylinder 12, the current strength maximum and the duty cycle of the pulse width-modulated signal can be kept low enough that the pulse width-modulated signal has a current strength, averaged over time, of less than 0.5 A (amperes). A thermal loading of second wheel outlet valve 22 (or of its electronics) can be reliably minimized in this way. Moreover, a current consumption can be reduced in this way. The pulse width-modulated signal can for example have a current strength, averaged over time, of less than 0.4 A, preferably less than 0.3 A, specifically less than 0.25 A. The duty cycle of the pulse width-modulated signal can be less than 0.25, specifically less than 0.2, in particular less than 0.15, and even less than 0.1. A pulse frequency of the pulse width-modulated signal is preferably less than 10 Hz (hertz), for example between 1 Hz and 9 Hz. (A period of the pulse width-modulated signal can thus have a duration of, e.g., between 50 ms and 1000 ms.)

The pulse width-modulated signal can be produced by a flyback diode and outputted to second wheel outlet valve 22. In this way, the method described here increases a multi-functionality of the flyback diode, which in many cases is already being used.

Figure 3:
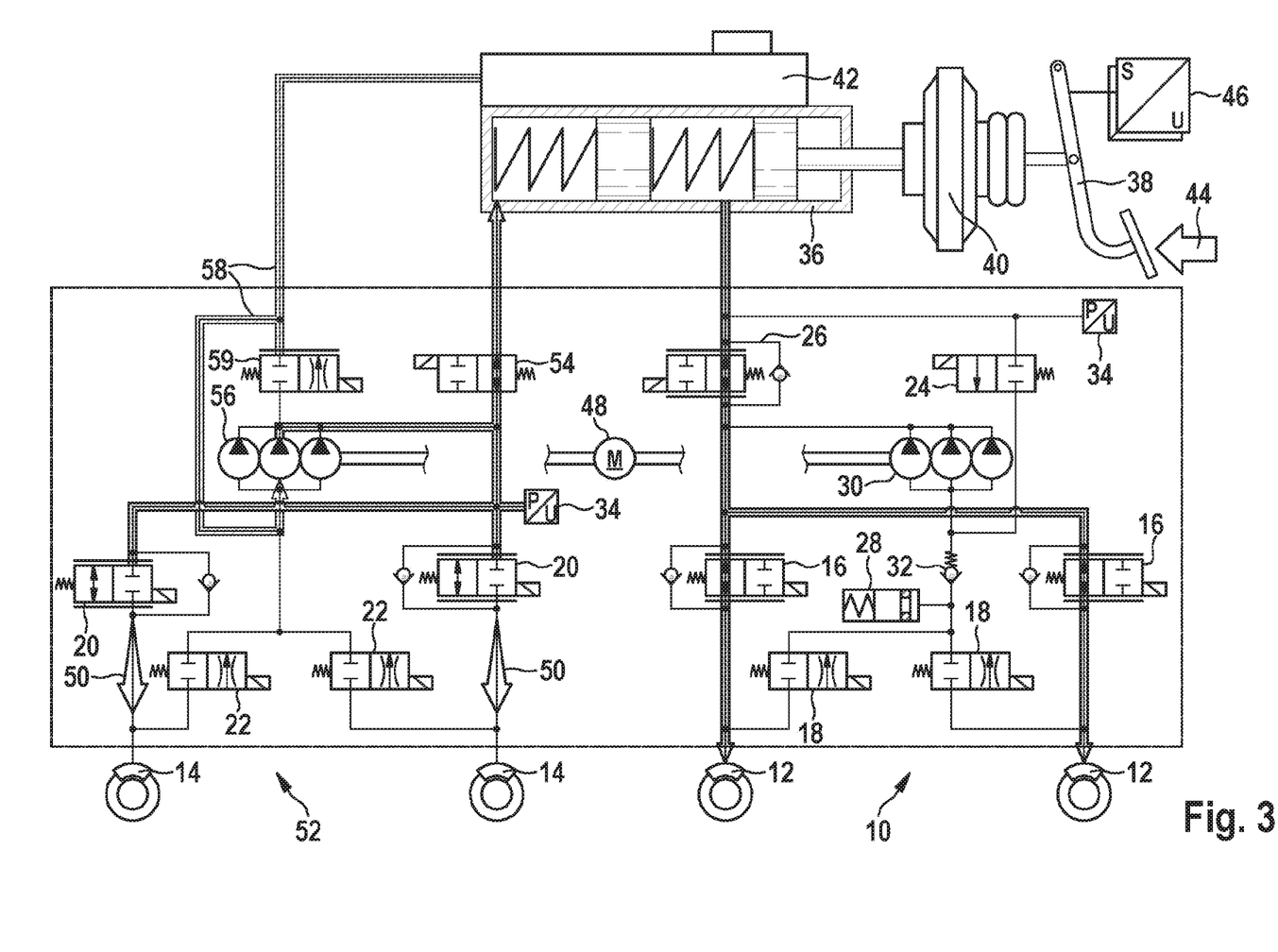
FIG. 3 shows a schematic representation of a vehicle brake system for the explanation of a second specific embodiment of the method in accordance with the present invention for increasing brake pressure in a first wheel brake cylinder and for limiting brake pressure in a second wheel brake cylinder of the vehicle brake system.

FIG. 3 shows a schematic representation of a vehicle brake system for the explanation of a second specific embodiment of the method in accordance with the present invention for increasing the brake pressure in a first wheel brake cylinder and for limiting the brake pressure in a second wheel brake cylinder of the vehicle brake system.

The wheel brake system schematically shown in FIG. 3 includes a first brake circuit 10 having at least one first wheel brake cylinder 12, a respective first wheel inlet valve 16 assigned to the at least one first wheel brake cylinder 12, and a respective first wheel outlet valve 18 assigned to the at least one first wheel brake cylinder 12, and a second brake circuit 52 having at least one second wheel brake cylinder 14, a respective second wheel inlet valve 20 assigned to the at least one second wheel brake cylinder 14, and a respective second wheel outlet valve 22 assigned to the at least one second wheel brake cylinder 14. Only as an example, each of the two brake circuits has exactly two wheel brake cylinders 12 and 14. Moreover, second brake circuit 52 can be decoupled from a master brake cylinder 36 by closing a separating valve 54. At least one pump 56 of second brake circuit 52 is connected to a brake fluid reservoir 42 via a suction line 58. Second brake circuit 52 additionally has another continuously adjustable valve 59 also connected to suction line 58. With regard to the further components of the vehicle brake system, reference is made to the earlier description above.

In the method shown graphically in FIG. 3 as well, a first brake pressure in at least one first wheel brake cylinder 12 is increased by, during an operation brought about by driver's force and/or motorically of at least one brake pressure buildup device 56, controlling and/or holding at least one first wheel inlet valve 16 in its open state and controlling and/or holding the at least one first wheel outlet valve 18 in its closed state, so that by the operation of the at least one brake pressure buildup device 56, brake fluid is transferred through at least the at least one open first wheel inlet valve 16 into the at least one first wheel brake cylinder 12. As the at least one brake pressure buildup device 56, the at least one pump 56 of second brake circuit 52 is operated in such a way that brake fluid is pumped from brake fluid reservoir 42 into master brake cylinder 36 by the at least one pump 56 of second brake circuit 52. (Due to the closed high-pressure switching valve 24, concomitant operation of the at least one pump 30 of first brake circuit 10 has no/hardly any effect.)

At the same time, an increase of a second brake pressure in the at least one second wheel brake cylinder 14 during the transfer of brake fluid into the at least one first wheel brake cylinder 12 is limited/prevented by controlling and/or holding the at least one second wheel inlet valve 20 in its closed state and controlling the at least one second wheel outlet valve 22 into its open state at least at times. In the specific embodiment described here as well, this is done by controlling the at least one second wheel outlet valve 22, during the transfer of brake fluid into the at least one first wheel brake cylinder 12, using a pulse width-modulated signal that brings it about that the at least one second wheel outlet valve 22 is permanently in its open state during the transfer of brake fluid into the at least one first wheel brake cylinder 12.

In this way, a brake pressure increase in the at least one first wheel brake cylinder 12 of first brake circuit 10 can be brought about by a pumping of brake fluid out of brake fluid reservoir 42, even though first brake circuit 10 is not connected to brake fluid reservoir 42. Moreover, an undesired brake pressure buildup in the at least one second wheel brake cylinder 14 of second brake circuit 52 connected to brake fluid reservoir 42 can be prevented. A vehicle axle assigned to second brake circuit 52 can thus easily be braked by a generator.

The specific embodiment of the method in accordance with the present invention described herein also ensures the advantages named above. Therefore, these advantages will not be listed again here.

Figure 4A:
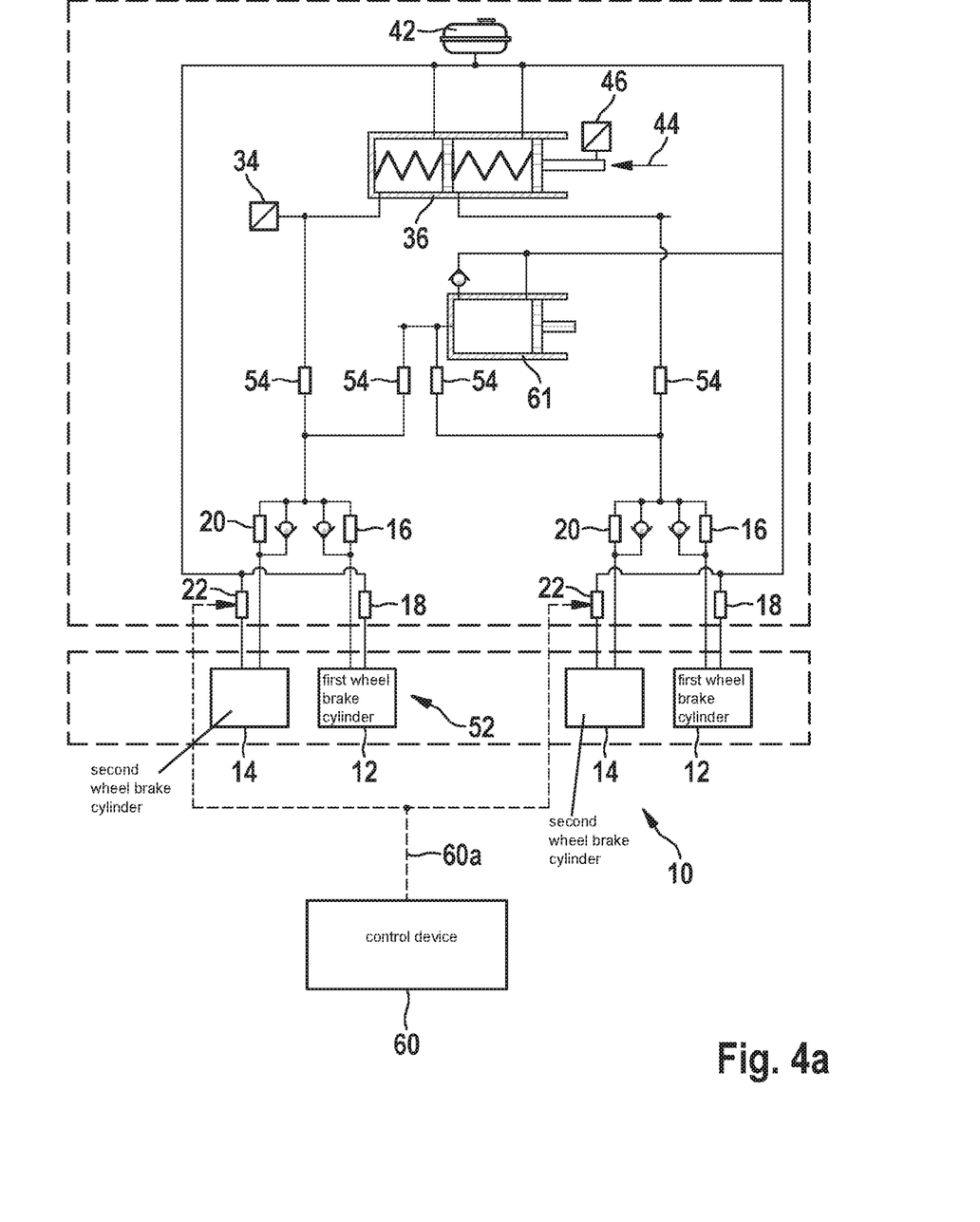
FIGS. 4a and 4b show schematic representations of a specific embodiment of the vehicle brake system and of its control device, in accordance with the present invention.
Figure 4B:
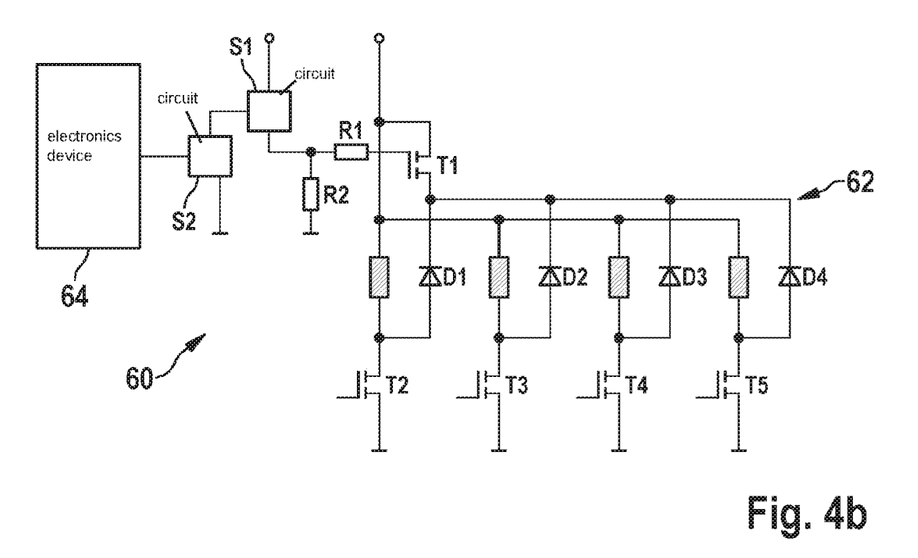

FIGS. 4a and 4b show schematic representations of a specific embodiment of the vehicle brake system and its control device in accordance with an example embodiment of the present invention. FIGS. 4a and 4b schematically show a vehicle brake system that, in addition to control device 60, also includes at least one brake pressure buildup device 61, a first wheel brake cylinder 12 having a first wheel inlet valve 16 assigned to first wheel brake cylinder 12 and a first wheel outlet valve 18 assigned to first wheel brake cylinder 12, and a second wheel brake cylinder 14 having a second wheel inlet valve 20 assigned to second wheel brake cylinder 14 and a second wheel outlet valve 22 assigned to second wheel brake cylinder 14. The at least one brake pressure buildup device 61 is designed and situated in the vehicle brake system in such a way that a flow of brake fluid through at least the open first wheel valve 16 into first wheel brake cylinder 12 can be brought about by an operation brought about by driver's force and/or motorically of the at least one brake pressure buildup device 61, and likewise a flow of brake fluid through at least the open second wheel inlet valve 20 into second wheel brake cylinder 14 can be brought about by the operation of the at least one brake pressure buildup device 61. As is shown in FIG. 4a, at least one motorized plunger device 61, such as in particular at least one integrated motor brake 61 (Integrated Power Brake, or IPB), can also be used as the at least one brake pressure buildup device 61. Only as an example, for this purpose first and second wheel brake cylinders 12 and 14 of a brake circuit 10 and 52 are connected to master brake cylinder 36 via a respective separating valve 54, and are connected to motorized plunger device 61 via a further respective separating valve 54. Further examples of the at least one brake pressure buildup device 61 have been indicated above. Here it is also expressly to be noted that the vehicle brake system equipped with control device 60 may also have all features of the above-described vehicle brake systems, instead of or in addition to the features shown in FIG. 4a. Moreover, the practicability of the vehicle brake system is limited neither to a particular brake system type nor to a specific vehicle type/motor vehicle type of the vehicle/motor vehicle equipped with the vehicle brake system.

Using control device 60, during the operation of the at least one brake pressure buildup device first wheel inlet valve 16 is controllable/controlled into its open state, first wheel outlet valve 18 is controllable/controlled into its closed state, second wheel inlet valve 20 is controllable/controlled into its closed state, and second wheel outlet valve 22 is at least at times controllable/controlled into its open state, so that a first brake pressure in first wheel brake cylinder 12 can be increased/is increased, while simultaneously an increase of a second brake pressure in second wheel brake cylinder 14 is at least limitable/is limited. For this purpose, control device 60 is designed to, during operation of the at least one brake pressure buildup device 61, control second wheel outlet valve 22 with a pulse width-modulated signal 60a in such a way that second wheel outlet valve 22 controlled by pulse width-modulated signal 60a is permanently in its open state. Control device 60 thus ensures the advantages already described above. In particular, using control device 60 all method steps of the above-described method can be carried out.

As is shown in FIG. 3, control device 60 includes at least one flyback diode 62. Moreover, control device 60 is designed to output pulse width-modulated signal 60a to second wheel outlet valve 22 using flyback diode 62. However, the electronic design of control device 60 shown schematically in FIG. 3, made up of diodes D1 to D4 (and coils configured parallel thereto), transistors T1 to T5, resistors R1 and R2, circuits S1 and S2, and an electronics device 64, is to be interpreted only as an example.

What is claimed is:

1. A vehicle brake system, comprising:
   at least one brake pressure buildup device;
   a first wheel brake cylinder having a first wheel inlet valve assigned to the first wheel brake cylinder and a first wheel outlet valve assigned to the first wheel brake cylinder, a flow of brake fluid through at least the first wheel inlet valve in its open state into the first wheel brake cylinder being brought about by an operation, brought about by driver's force and/or motorically, of the at least one brake pressure buildup device;
   a second wheel brake cylinder having a second wheel inlet valve assigned to the second wheel brake cylinder and a second wheel outlet valve assigned to the second wheel brake cylinder, a flow of brake fluid through at least the second wheel inlet valve in its open state into the second wheel brake cylinder being brought about by the operation of the at least one brake pressure buildup device; and
   a control device by which, during the operation of the at least one brake pressure buildup device, the first wheel inlet valve can be controlled into its open state, the first wheel outlet valve can be controlled into its closed state, the second wheel inlet valve can be controlled into its closed state, and the second wheel outlet valve can be controlled at least at times into its open state, so that a first brake pressure in the first wheel brake cylinder can be increased while an increase of a second brake pressure in the second wheel brake cylinder is simultaneously at least limitable;
   wherein the control device is configured to, during the operation of the at least one brake pressure buildup device, control the second wheel outlet valve with a pulse width-modulated signal in such a way that the second wheel outlet valve controlled by the pulse width-modulated signal is permanently in its open state.

2. The vehicle brake system as recited in claim 1, wherein the control device is configured to, during the operation of the at least one brake pressure buildup device, hold a current strength maximum and a duty cycle of the pulse width-modulated signal low enough that the current strength maximum and the duty cycle are just sufficient to hold the second wheel outlet valve controlled by the pulse width-modulated signal permanently in its open state.

3. The vehicle brake system as recited in claim 2, wherein the control device is configured to, during the operation of the at least one brake pressure buildup device, hold the current strength maximum and the duty cycle of the pulse width-modulated signal low enough that the pulse width-modulated signal has a current strength, averaged over time, of less than 0.5 A.

4. The vehicle brake system as recited in claim 1, wherein the control device includes at least one flyback diode and is configured to output the pulse width-modulated signal to the second wheel outlet valve using the flyback diode.

5. The vehicle brake system as recited in claim 1, further comprising:
   a master brake cylinder: (i) to which a brake actuating element is connectable or is connected, and/or (ii) before which a brake booster is pre-positioned;
   wherein at least one pump and/or at least one motorized plunger device is the at least one brake pressure buildup device.

6. The vehicle brake system as recited in claim 1, wherein the first wheel brake cylinder with its assigned first wheel inlet valve and its assigned first wheel outlet valve, and the second wheel brake cylinder with its assigned second wheel inlet valve and its assigned second wheel outlet valve, are situated in a common brake circuit of the vehicle brake system.

7. A method for increasing a brake pressure in a first wheel brake cylinder and for limiting a brake pressure in a second wheel brake cylinder of a vehicle brake system, the method comprising the following steps:
   increasing a first brake pressure in the first wheel brake cylinder by, during an operation brought about by a driver's force and/or motorically of at least one brake pressure buildup device, controlling and/or holding a first wheel inlet valve assigned to the first wheel brake cylinder in its open state, and controlling and/or holding a first wheel outlet valve assigned to the first wheel brake cylinder in its closed state, so that brake fluid is transferred through at least the first wheel inlet valve in its open state into the first wheel brake cylinder by the operation of the at least one brake pressure buildup;
   at least limiting an increase of a second brake pressure in the second wheel brake cylinder during the transfer of brake fluid into the first wheel brake cylinder by controlling and/or holding a second wheel inlet valve assigned to the second wheel brake cylinder in its closed state, and controlling a second wheel outlet valve, assigned to the second wheel brake cylinder, at least at times into its open state; and controlling the second wheel outlet valve, during the transfer of brake fluid into the first wheel brake cylinder, with a pulse width-modulated signal that brings about that during the transfer of brake fluid into the first wheel brake cylinder, the second wheel outlet valve is permanently in its open state.

8. The method as recited in claim 7, wherein a current strength maximum and a duty cycle of the pulse width-modulated signal is kept so low during the transfer of brake fluid into the first wheel brake cylinder, the current strength maximum and the duty cycle are just sufficient to bring about that the second wheel outlet valve is permanently in its open state during the transfer of brake fluid into the first wheel brake cylinder.

9. The method as recited in claim 8, wherein the current strength maximum and the duty cycle of the pulse width-modulated signal are kept so low during the transfer of brake fluid into the first wheel brake cylinder that the pulse width-modulated signal has a current strength, averaged over time, of less than 0.5 A.

10. The method as recited in claim 7, wherein the pulse width-modulated signal is produced and output to the second wheel outlet valve by a flyback diode.

* * * * *